March 14, 1939.  F. X. LAMB  2,150,836
ELECTRICAL MEASURING INSTRUMENT
Filed Feb. 27, 1937
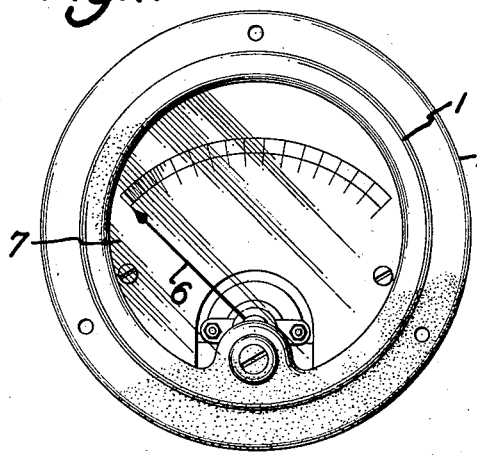
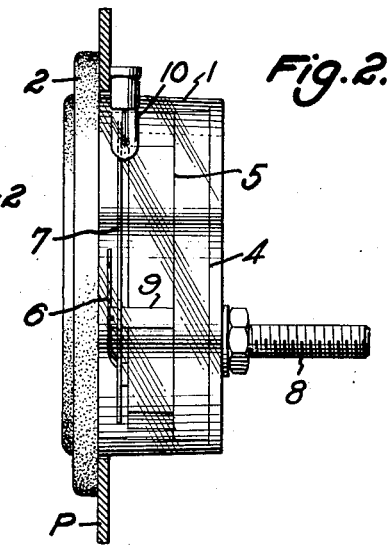
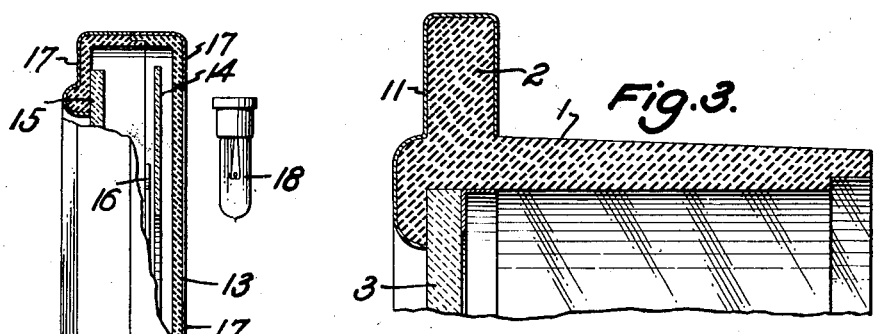
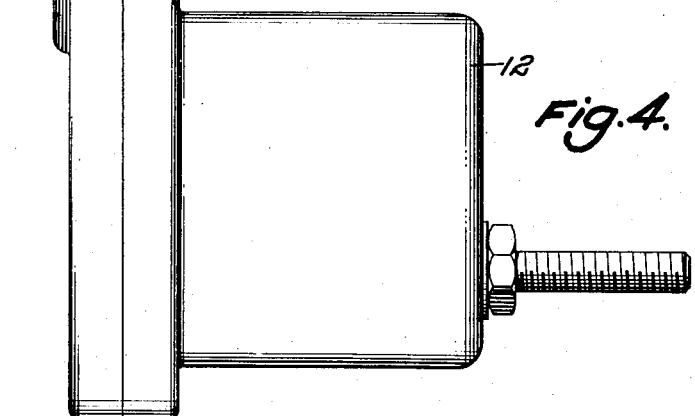
Inventor:
Francis X. Lamb,
By Potter, Pierce & Scheffler
Attorneys.

Patented Mar. 14, 1939

2,150,836

UNITED STATES PATENT OFFICE 2,150,836

ELECTRICAL MEASURING INSTRUMENT

Francis X. Lamb, East Orange, N. J., assignor to Weston Electrical Instrument Corporation, Newark, N. J., a corporation of New Jersey Application February 27, 1937, Serial No. 128,266

4 Claims. (Cl. 73—151)

This invention relates to electrical measuring instruments and more particularly to electrical measuring instruments having illuminated scale plates.

It has been the practice to provide a direct illumination of the scale plates by lights placed on the front of a panel board, or an indirect illumination by small lights placed within the instrument casing. The direct illumination method may be used whether the instruments are of large or of small size, but the recent trend towards small size instruments has made it impossible to place a light bulb within the instrument casing. It has been proposed to replace a section of the instrument casing by a glass window and to place a lamp bulb back of the panel to obtain an indirect illumination of the scale plate, but this adds to the expense of manufacture and, by increasing the number of parts, increases the possibility that dirt and moisture may enter the instrument casing.

An object of this invention is to provide an electrical measuring instrument having a unitary casing that permits an indirect illumination of the scale plate by a light located outside the casing. An object is to provide an electrical measuring instrument having a transparent molded casing for admitting light to the scale plate. More specifically, an object of this invention is to provide an electrical measuring instrument of the flush mounting type which has a transparent casing of molded material for admitting light to the interior of the casing, and an opaque enamel coating on portions of the casing to simulate the conventional instrument casings of molded plastics.

These and other objects and advantages of the invention will be apparent from the following specification when taken with the accompanying drawing in which:

Fig. 1 is a front elevation of an embodiment of the invention;

Fig. 2 is a fragmentary vertical section through a panel having mounted thereon an instrument such as shown in Fig. 1, the instrument being shown in side elevation;

Fig. 3 is an enlarged fragmentary sectional view of the instrument casing of Figs. 1 and 2; and Fig. 4 is a side elevation, with parts in section, of another embodiment of the invention.

In the drawing, the reference numeral 1 identifies a molded cylindrical instrument casing having an integral flange 2 which adapts the instrument for flush mounting on a panel P. The outer end of the casing carries the cover glass 3, and the inner end is secured to a base 4 of molded plastic material, such as phenolic resin, which supports a permanent magnet 5 and a moving system that includes a pointer 6 that is displaceable over a graduated scale plate 7. The terminals 8 and the posts 9 that carry the scale plate 7 are secured to or molded into the base 4 in the usual manner.

This illustration of the instrument parts will be recognized as typical of small panel-mounting types of instruments now in general use. The interior of the casing 1 is substantially completely filled by the measuring instrument and it is not practical to locate a small lamp bulb within the casing to illuminate the scale plate.

In accordance with this invention, the casing 1 is formed of a transparent organo-plastic material such as a vinyl resin, cellulose acetate or the methyl methacrylate molding material sold commercially under the trade-mark "Lucite". A light source at the rear of the panel, such as the small lamp bulb 10 at the exterior of and adjacent the casing 1, will therefore light the pointer 6 and scale plate 7 by indirect illumination. An opaque enamel coating 11 is preferably sprayed upon the outer end of the casing 1 and its mounting flange 2, to simulate the appearance of the conventional instrument casings formed of an opaque molded resin.

In the embodiment of the invention which is illustrated in Fig. 4, the entire instrument casing is formed of a transparent plastic, the casing including a base or cylindrical section 12 for housing the instrument proper, a sectorial enlargement 13 extending above the cylindrical section to house the translucent scale plate 14, and a cover 15 which completes the instrument housing. The cover section has a window opening provided with a glass plate through which the pointer 16 and scale plate may be viewed, and the entire cover 15 and the cylindrical section 12 may be covered with an opaque enamel 17. The rear face of the extension 13, or at least that portion which alines with the scale plate 14, is uncoated to pass light from a lamp 18 at the rear of a panel to the instrument scale plate 14. The instrument pointer 16 is opaque and its displacement along the translucent scale plate 14 is easily read with this indirect illumination of the scale plate from a light source at the rear of the panel and exterior to the instrument casing.

Instrument casings of the type contemplated by this invention are not expensive to manufacture, provide adequate protection against dirt and moisture, and permit the indirect illumination of the scale plates of one or more small instruments from a light source at the rear of an instrument panel.

It is to be understood that the invention is not restricted to the specific embodiments herein described and that there is considerable latitude in the design and construction of electrical measuring instruments that fall within the spirit of my invention as set forth in the following claims.

I claim:

1. A measuring instrument comprising an instrument movement including a pointer movable over a scale plate, and a casing for housing said instrument movement, said casing including an opaque flange for the flush mounting of the casing on a panel and a cylindrical section of a transparent organo-plastic surrounding the scale plate, whereby said scale plate may be illuminated by a light source exterior to said casing.

2. An electrical measuring instrument comprising an instrument movement supported on a base and including a pointer movable over a scale plate, a casing formed of a transparent organo-plastic material housing said instrument movement, means for mounting said casing on a panel and with portions thereof at opposite sides of the panel, and an opaque coating upon said portion of the casing which will lie in front of a panel upon which the casing is mounted.

3. An instrument as claimed in claim 2, wherein said casing comprises a flanged cylindrical section secured to a base on which the instrument movement is mounted, the flange of said cylindrical section having the opaque coating thereon and being adapted to seat upon the panel for the flush mounting of the casing thereon.

4. An instrument as claimed in claim 2, wherein said scale plate is translucent, and said casing comprises a main section comprising a cylindrical portion having a sectorial extension housing said scale plate and a cover section, said opaque coating extending over said cover section and the cylindrical portion of said main section.

FRANCIS X. LAMB.